(12) United States Patent
Kotha et al.

(10) Patent No.: US 12,711,109 B1
(45) Date of Patent: Aug. 18, 2026

(54) SYSTEM AND METHOD FOR RECOMMENDING AN OPTIMAL NUMBER OF DATA SESSIONS TO ACCESS A DATABASE

(71) Applicant: Bank of America Corporation, Charlotte, NC (US)

(72) Inventors: Kartheek Kotha, Celina, TX (US); Karthikeya Venkata Sastry Meduri, Chennai (IN); Vignesh Rajan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/272,320

(22) Filed: Jul. 17, 2025

(51) Int. Cl.
*G06F 16/21* (2019.01)
*G06N 20/00* (2019.01)

(52) U.S. Cl.
CPC ............ *G06F 16/21* (2019.01); *G06N 20/00* (2019.01)

(58) Field of Classification Search
CPC ................................ G06F 16/21; G06N 20/00
See application file for complete search history.

(56) References Cited

U.S. PATENT DOCUMENTS

| | | | | |
|---|---|---|---|---|
| 8,407,105 | B2 | 3/2013 | Linden et al. | |
| 9,419,951 | B1 | 8/2016 | Felsher et al. | |
| 9,609,459 | B2 | 3/2017 | Raleigh | |
| 10,003,605 | B2 * | 6/2018 | Muddu | G06N 20/20 |
| 10,284,721 | B2 * | 5/2019 | Soundar | H04M 3/51 |
| 10,362,084 | B2 * | 7/2019 | Coulombe | H04L 65/70 |
| 10,567,582 | B1 | 2/2020 | Neuer, III et al. | |
| 10,656,775 | B2 * | 5/2020 | Wekke | H04L 65/1069 |
| 10,949,750 | B2 | 3/2021 | Thornton et al. | |
| 10,979,875 | B2 * | 4/2021 | Dai | H04W 4/10 |
| 11,222,330 | B2 | 1/2022 | Dua | |
| 11,362,851 | B2 | 6/2022 | Ansari et al. | |
| 11,811,826 | B2 | 11/2023 | Moon et al. | |
| 11,876,852 | B2 * | 1/2024 | Dhanabalan | H04L 43/0882 |
| 12,165,635 | B2 * | 12/2024 | Gruber | G06F 3/167 |
| 12,386,691 | B1 * | 8/2025 | Jain | G06F 11/0709 |
| 12,541,751 | B2 * | 2/2026 | Cella | G05D 1/0297 |
| 2020/0210955 | A1 * | 7/2020 | Bar-On | G06F 8/70 |
| 2021/0186329 | A1 | 6/2021 | Tran | |

(Continued)

FOREIGN PATENT DOCUMENTS

| | | | | |
|---|---|---|---|---|
| CN | 120525098 A | * | 8/2025 | G06N 3/092 |
| CN | 120580041 A | * | 9/2025 | G06F 16/9535 |

*Primary Examiner* — Mark E Hershley

(57) ABSTRACT

A system includes a memory storing an AI model, and a processor configure to receive a first request to establish a first number of sessions with the database server for a task, determine that a recommended number of sessions for the task has not been provided, determine features associated with the task, collect features associated with a real-time computing environment for the task, determine an optimal number of sessions for the task using the AI model, determine that the optimal number differs from the first number, provide a recommendation for the task with the determined optimal number of sessions for the task, receive a second request to establish a second number of sessions with the database server for the task, determine that the recommended number of sessions for the task has been provided, and establish the second number of sessions with the database server for the task.

20 Claims, 4 Drawing Sheets

(56) References Cited

U.S. PATENT DOCUMENTS

| | | | | |
|---|---|---|---|---|
| 2022/0121982 | A1* | 4/2022 | Rajagopalan | G06F 9/5011 |
| 2023/0135553 | A1* | 5/2023 | Cella | G05D 1/0297 |
| 2023/0206329 | A1* | 6/2023 | Cella | G06Q 20/405 |
| 2024/0370627 | A1 | 11/2024 | Ricci | |
| 2024/0394075 | A1* | 11/2024 | Kelly | G06F 9/5027 |
| 2024/0394088 | A1* | 11/2024 | Kelly | G06F 9/45558 |
| 2025/0363224 | A1* | 11/2025 | Lokesh | G06F 21/60 |

* cited by examiner

SYSTEM AND METHOD FOR RECOMMENDING AN OPTIMAL NUMBER OF DATA SESSIONS TO ACCESS A DATABASE

TECHNICAL FIELD

The present disclosure relates generally to network resource management, and more specifically, to system and method for recommending an optimal number of data sessions to access a database.

BACKGROUND

A communication session typically represents a single, continuous exchange of messages (queries and responses) between a client and a database server. A number of separate and concurrent sessions may be utilized by a task, typically a batch task, for the purpose of exchanging data. The number of sessions for a task is usually specified by a user, and the client establishes the specified number of sessions and has them ready for the data transfer. With this approach, the sessions are connected before the data transfer is initiated. When the number of specified sessions is smaller than required, the task may take a considerable amount of time to complete. When the number of specified sessions is larger than required, the task may prevent the other tasks from establishing their respective required number of communication sessions, while the established communication sessions for the task are underutilized.

SUMMARY

The system and method disclosed herein relate to the utilization of an artificial intelligence (AI) model for recommending an optimal number of sessions required for completing a task that includes data transfer between a client and a database. This recommendation is primarily based on features associated with the task and features associated with a real-time computing environment. The recommendation is also based on a priority flag associated with the task.

The system and method disclosed herein aim to eliminate the trial-and-error strategies typically adopted by users to identify the optimal number of sessions necessary for completing tasks in an efficient manner. By implementing the recommendations provided by the AI model, the system maintains an optimal and pristine state, connecting only the required number of sessions. When the optimal number of sessions is connected, the system and method may reduce CPU usage and memory consumption on both the client and the database server. Furthermore, the invention disclosed herein may enhance the network utilization while keeping a small task completion time.

In one embodiment, the disclosed system includes a memory operable to store an AI model configured to compute a desired number of sessions to establish with a database server for a given task based on features associated with the given task and features associated with a real-time computing environment for the given task. The AI model is trained using data extracted from historical records associated with previous tasks.

In one embodiment, the disclosed system includes a processor, operably coupled to the memory, that is configured to receive a first request to establish a first number of sessions with the database server for a task that comprises accessing a database on the database server. The request may comprise information associated with the task.

In one embodiment, the processor is configured to determine whether a recommended number of sessions for the task has been provided.

In one embodiment, when the processor determines that the recommended number of sessions for the task has not been provided, the processor is configured to determine an optimal number of sessions for the task.

In one embodiment, to determine the optimal number of sessions for the task, the processor is configured to determine features associated with the task. The features associated with the task may comprise a size of data to be transferred, a classification of the data, a priority associated with the task, or any suitable feature associated with the task.

In one embodiment, the task comprises uploading data into the database. In such a case, to determine the features associated with the task, the processor is further configured to measure the data to be uploaded to the database in a storage associated with the system.

In one embodiment, the task comprises downloading data from the database. In such a case, to determine the features associated with the task, the processor is further configured to retrieve the size of the data to be transferred and/or the classification of the data from the database.

In one embodiment, to determine the optimal number of sessions for the task, the processor is further configured to collect features associated with a real-time computing environment for the task. The features associated with the real-time computing environment for the task may comprise a network bandwidth between the system and the database server, a measured network latency between the system and the database server, hardware capacities of the database server, and hardware capacities of the system.

In one embodiment, to determine the optimal number of sessions for the task, the processor is further configured to determine an optimal number of sessions for the task by processing the features associated with the task and the features associated with the real-time computing environment for the task with the AI model.

In one embodiment, the processor is configured to determine whether the optimal number is different from the first number. Upon determining that the optimal number is different from the first number, the processor is configured to provide the determined optimal number of sessions for the task as the recommended number of sessions for the task.

In one embodiment, the processor is configured to receive a second request to establish a second number of sessions with the database server for the task.

In one embodiment, the processor is configured to determine that the recommended number of sessions for the task has already been provided. In response to the determination that the recommended number of sessions for the task has already been provided, the processor is configured to establish the second number of sessions with the database server for the task.

In one embodiment, the processor is configured to detect the completion of the task. The processor is further configured to measure a session utilization ratio associated with the task and an amount of time to complete the task. The processor is further configured to determine, based on the session utilization ratio and the amount of time, whether the second number is within a range of acceptable numbers of sessions for the task. When the processor determines that the second number is beyond the range of acceptable numbers of sessions for the task, the processor is further configured to re-train the AI model.

In one embodiment, the AI model is a regression model. To prepare the AI model, the processor is further configured to extract training data from historical records associated with previous tasks, iteratively train the AI model using the training data until a training completion condition is satisfied, evaluate the AI model based on a proportion of variance in a dependent variable, representing the labels, that is explained by independent variables, corresponding to the input features, and p-values of individual coefficients, and deploy the AI model in conjunction with a successful evaluation.

In one embodiment, to extract the training data from the historical records associated with previous tasks, the processor is configured to determine a label for each task in the historical records with a corresponding optimal number of sessions.

In one embodiment, to determine a label for each task in the historical records with a corresponding optimal number of sessions, the processor is further configured to select, among tasks in the historical records, a subset of tasks, each having a proper number of established sessions. The processor may determine whether the task has the proper number of established sessions based on a session utilization ratio and an amount of time to complete the task in the historical records. The processor is further configured to determine the number of established sessions as the label for the task.

In one embodiment, to determine a label for each task in the historical records with a corresponding optimal number of sessions, the processor is further configured to determine, for each task in the historical records, an optimal number of sessions for the task based on a number of established sessions for the task, a session utilization ratio, and an amount of time to complete the task in the historical records. When the session utilization ratio is lower than a first pre-determined threshold, the processor may determine a lower number than the number of established sessions in the historical records as the optimal number of sessions for the task. When the session utilization ratio is higher than a second pre-determined threshold and the amount of time to complete the task is greater than a threshold time for a type corresponding to the task, the processor may determine a higher number than the number of established sessions in the historical records as the optimal number of sessions for the task.

In one embodiment, to extract the training data from the historical records associated with previous tasks, the processor is further configured to collect, for each labelled task, input features from the historical records. The input features may comprise features associated with the task and features associated with a computing environment for the task.

In one embodiment, to extract the training data from the historical records associated with previous tasks, the processor is further configured to postprocess the collected input features, wherein postprocessing comprises filling any missing values based on the historical records.

In one embodiment, to extract the training data from the historical records associated with previous tasks, the processor is further configured to divide the labels and the input features for the labelled task into training data and testing data.

Technical advantages of certain embodiments of this disclosure may include one or more of the following. The disclosed system and methods can determine an optimal number of sessions between a client system and a database server to complete a task, including the exchange of data between the client system and the database server. When the established number of sessions is less than the optimal number, the data transfer through the sessions may take longer than desired. Consequently, consuming unnecessary computing resources, such as processors and memory, on the client system and the database server. Therefore, the disclosed system and methods may result in conserving computing resources on both the client system and the database server and reducing the task completion time by allowing the establishment of the optimal number of sessions to complete the task. When the established number of sessions is greater than the optimal number, network resources corresponding to the established session may be underutilized. Furthermore, the excessively established sessions may prevent the other tasks from establishing their required number of sessions. Then, the client system and the database server may consume unnecessary computing resources to complete the other tasks. Therefore, the disclosed system and methods may result in conserving computing resources to complete the other tasks as well as improving the network bandwidth utilization.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, establishing an optimal number of sessions between a client system and a database server to complete a task that includes the exchange of data between the client system and the database server may result in conserving computing resources, such as processors and memory, on both the client system and the database server as well as improving network utilization. With reference to FIGS. 1-4, this disclosure presents various systems and methods to recommend an optimal number of sessions between the client system and the database server to complete a task, including the exchange of large data between the client system and the database server.

Example Embodiment of a Computing System Environment

Figure 1:
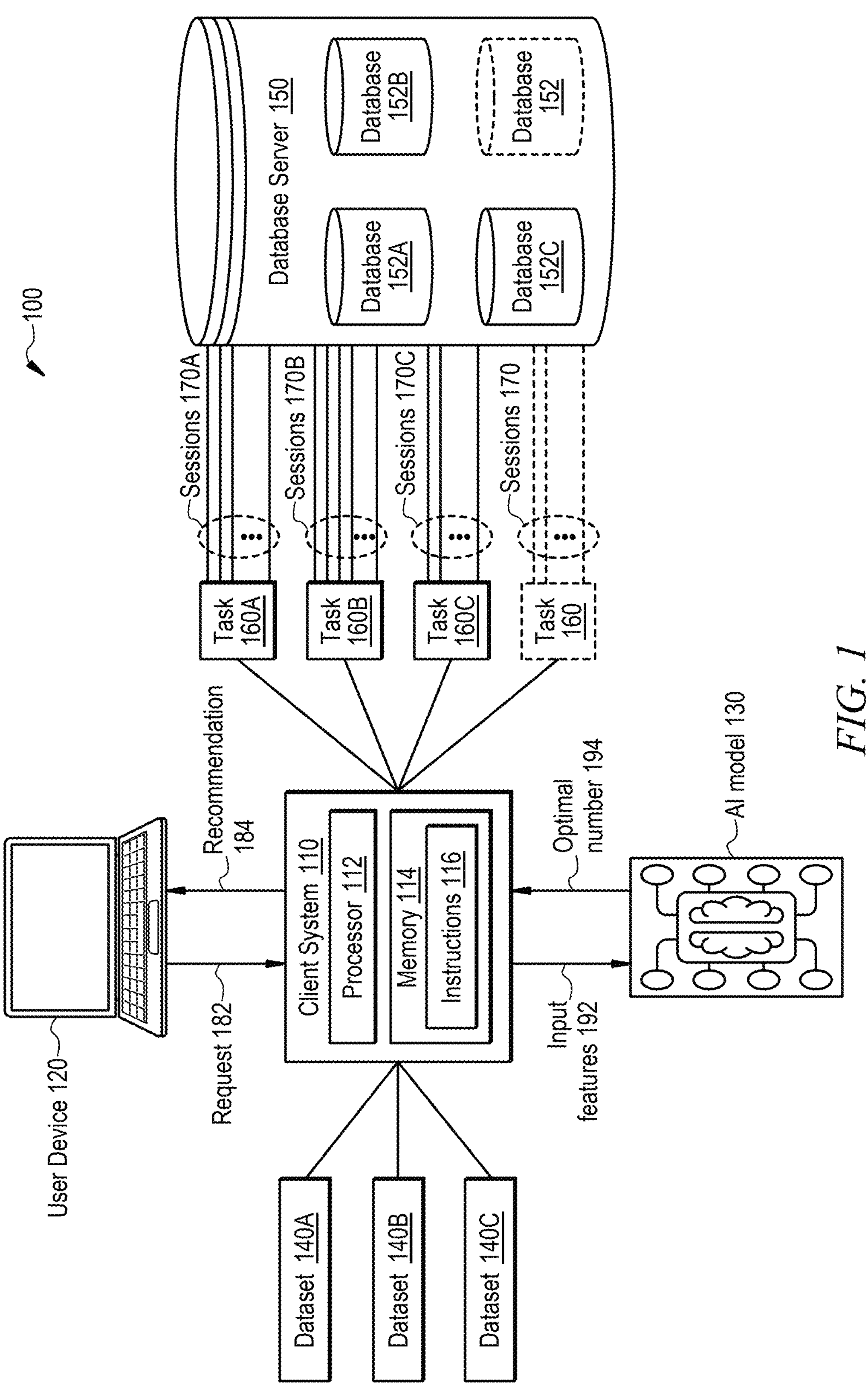
FIG. 1 illustrates one embodiment of a computing system environment where a number of sessions are established to complete each task that includes data transfer between a client system and a database server.

FIG. 1 illustrates one embodiment of a computing system environment where a number of sessions are established to complete each task that includes data transfer between a client system and a database server. A client system 110 may run database utilities/applications performing tasks 160A, 160B, and 160C that require accessing one or more databases 152A, 152B, and 152C in a database server 150. Each task 160 may establish a number of sessions 170 with the database server 150 to complete the task 160. The client system 110 may be associated with local datasets 140A, 140B, and 140C. The client system 110 may also be associated with an AI model 130 that is trained to compute an optimal number of sessions for completing a task based on features. A user may interact with the client system 110 via a user device 120.

Architecture Components

Datasets

The tasks 160A, 160B, and 160C may include transferring data from the client system 110 to one of the databases 152A, 152B, and 152C or transferring data from one of the databases 152A, 152B, 152C to the client system 110. The data on the client system 110 may be stored in one or more datasets 140A, 140B, and 140C. To upload the data to the database 152, the client system 110 accesses data from one or more of the datasets 140A, 140B, and 140C. To download the data from the database 152, the client system 110 stores downloaded data to one or more of the datasets 140A, 140B, and 140C. In particular embodiments, the datasets 140A, 140B, and 140C are stored at storage separate from the client system 110. In particular embodiments, the datasets 140A, 140B, and 140C are stored in a storage of the client system 110.

AI Model

An AI model 130 is configured to compute a desired number of sessions to establish with a database server for a given task based on features associated with the given task and features associated with a real-time computing environment for the given task. The AI model 130 may be trained using data extracted from historical records associated with previous tasks.

In particular embodiments, the AI model 130 is a regression model. The AI model 130 may be prepared by extracting training data from historical records associated with previous tasks, iteratively training the AI model 130 using the training data until a training completion condition is satisfied, evaluating the AI model 130, and deploying the AI model 130 in conjunction with a successful evaluation.

In particular embodiments, extracting the training data from the historical records associated with previous tasks comprises determining a label for each task in the historical records with a corresponding optimal number of sessions.

In one embodiment, to determine a label for each task in the historical records with a corresponding optimal number of sessions, a subset of tasks among the tasks in the historical records is selected, where each task in the subset has a proper number of established sessions. Whether the task has the proper number of established sessions may be determined based on a session utilization ratio and an amount of time to complete the task in the historical records. When the session utilization ratio in the historical records is higher than a threshold, the number of established sessions may be considered not too large. Also, the amount of time to complete the task in the historical records may be compared with the average amount of time to complete tasks of a similar type. When the amount of time corresponding to the task is within a pre-defined range of the average amount of time to complete the tasks of a similar type, the number of established sessions may be considered not too small. The number of established sessions may be determined to be the proper number based on the session utilization ratio and the amount of time to complete the task. Once the number of established sessions is determined to be proper, the number of established sessions is determined as the label, a ground truth value for the training, for the task.

In another embodiment, a label for each task in the historical records is determined with a corresponding optimal number of sessions for the task. The optimal number of sessions for the task may be determined based on a number of established sessions for the task, a session utilization ratio, and an amount of time to complete the task in the historical records. When the session utilization ratio is lower than a first pre-determined threshold, a number lower than the number of established sessions in the historical records is determined as the optimal number of sessions for the task. When the session utilization ratio is higher than a second pre-determined threshold and the amount of time to complete the task is greater than a threshold time for a type corresponding to the task, a number higher than the number of established sessions in the historical records is determined as the optimal number of sessions for the task.

In one embodiment, extracting the training data from the historical records associated with previous tasks also includes collecting input features for each labelled task from the historical records. The input features may include features associated with the task and features associated with a computing environment for the task.

In one embodiment, extracting the training data from the historical records associated with previous tasks further includes postprocessing the collected input features. Postprocessing includes filling in any missing values based on the historical records, and it may also include filtering out outliers from consideration.

In one embodiment, extracting the training data from the historical records associated with previous tasks again includes dividing the labels and the input features for the labelled task into training data and testing data.

In one embodiment, the AI model 130 is iteratively trained using the training data until a training completion condition is satisfied. At a pre-determined interval, the trained AI model 130 is tested using the testing data, which is different from the training data. In one embodiment, the training completion condition is satisfied when the number of training iterations reaches a pre-determined number of iterations. In another embodiment, the training completion condition is satisfied when the training loss starts to increase. In yet another embodiment, the training completion condition is satisfied when the testing loss starts to increase while the training loss keeps decreasing.

In one embodiment, the AI model 130 may be a multi-linear regression model. The multi-linear regression model may be used to model the relationship between dependent variables, labels, and one or more independent variables, features, by fitting a linear equation to observed data. In such a scenario, training the AI model 130 may be a process of determining a coefficient for each input feature representing an impact of the input feature on the number of sessions required for the task.

In one embodiment, the AI model 130 may be evaluated based on a proportion of variance in a dependent variable, representing the labels, that is explained by independent variables, corresponding to the input features. The proportion of variance is also known as the coefficient of determination. The value ranges from 0 to 1. Zero means that the model explains none of the variability. One means that the model explains all of the variability. The AI model 130 may also be evaluated based on p-values of individual coefficients. The p-value of an individual coefficient tests the null hypothesis that the coefficient is equal to zero, meaning that the corresponding feature has no effect on the label value.

In one embodiment, the AI model 130 is deployed in conjunction with a successful evaluation. In particular embodiments, the AI model 130 may be deployed on the client system 110. In such a case, the memory 114 may include the AI model 130 in addition to the instructions 116. In particular embodiments, the AI model 130 may be deployed on a computing system different from the client system 110. In such a case, the client system 110 may access the AI model 130 using an application programming interface (API) provided by the AI model 130.

Database Server

Database server 150 is a computing system configured to maintain a number of databases 152A, 152B, and 152C. The database server 150 accepts session establishment requests from one or more client systems 110, where one or more sessions may be used to perform a task 160. For example, a first number of sessions 170A are established for task 160A. A second number of sessions 170B are established for task 160B. A third number of sessions 170C are established for task 160C. When a task 160 includes transferring large data in either direction, a large number of sessions may be utilized to complete task 160 in a timely manner. The database server 150 typically has large memory spaces to accommodate the databases 152A, 152B, and 152C. The database server 150 also has one or more processors that are configured to handle session establishments, data transfers over the established sessions, as well as retrieving, storing, and modifying data from the databases 152A, 152B, and 152C.

User Device

A user may access the client system 110 using a user device 120. The user may provide instructions to the client system 110 and receive responses from the client system 110 displayed on the display device of the user device 120. The instructions from the user may include a request to establish a number of sessions to complete a task. The user device 120 may be a desktop computer, a laptop computer, a tablet computer, a mobile device, or any suitable user device. In particular embodiments, the user may access the client system 110 directly. In such a case, the client system 110 may work as a user device 120 as well.

Client System

Client system 110 may be generally any device that is configured to process data and communicate with devices, networks, systems, etc. Client system 110 may be generally configured to perform operations described further below in conjunction with at least method 200 described in FIG. 2. In an embodiment, client system 110 may comprise a processor 112 in signal communication with a memory 114.

Processor 112 comprises one or more processors operably coupled to the memory 114. Processor 112 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). Processor 112 may be a programmable logic device, a microcontroller, a microprocessor, or any suitable combination of the preceding. Processor 112 is communicatively coupled to and in signal communication with memory 114. Processor 112 is configured to process data. For example, processor 112 may be 8-bit, 16-bit, 32-bit, 64-bit or of any other suitable architecture. Processor 112 may include an arithmetic logic unit (ALU) for performing arithmetic and logic operations, processors register that supply operands to the ALU and store the results of ALU operations, and a control unit that fetches software instructions 116 from memory 114 and executes them by directing the coordinated operations of the ALU, registers and other components. Processor 112 is configured to implement various software instructions 116. For example, processor 112 is configured to execute software instructions 116 to implement the functions disclosed herein, such as some or all of those described with respect to FIGS. 1-4. In some embodiments, the function described herein is implemented using logic units, FPGAs, ASICs, DSPs, or any other suitable hardware or electronic circuitry.

Memory 114 may be volatile or non-volatile and may comprise a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. Memory 114 is operable to store the software (e.g., AI model 130), and/or any other data or software instructions 116.

Software instructions 116 may comprise any suitable set of instructions, logic, rules, or code operable to execute processor 112. Software instructions 116, when executed by processors 112, cause processor 112 to perform one or more functions described herein. For example, software instructions 116, when executed by processor 112, cause processor 112 to receive a first request to establish a first number of sessions 170 with the database server 150 for a task 160 that comprises accessing a database 152 on the database server 150. The request may comprise information associated with the task. Software instructions 116, when executed by processor 112, cause processor 112 to determine whether a recommended number of sessions for the task 160 has been provided. Software instructions 116, when executed by processor 112, cause processor 112 to determine an optimal number of sessions for the task 160 when the processor 112 determines that the recommended number of sessions for the task has not been provided.

Software instructions 116, when executed by processor 112, cause processor 112 to determine features associated with the task 160 to determine the optimal number of sessions for the task. The features associated with the task may comprise a size of data to be transferred, a classification of the data, and a priority associated with the task.

In one embodiment, the task 160 comprises uploading data into the database 152. In such a case, software instructions 116, when executed by processor 112, cause processor 112 to measure the data to be uploaded to the database 152 in a storage associated with the system to determine the features associated with the task 160. The data to be uploaded to the database 152 may be in datasets 140A, 140B, and 140C. The size of the data to be uploaded and the classification of the data to be uploaded may be determined by this. In particular embodiments, the priority associated with the task may be provided by the user. In particular embodiments, the priority associated with the task may be retrieved from configuration records associated with tasks 160A, 160B, and 160C.

In one embodiment, the task 160 comprises downloading data from the database. In such a case, software instructions 116, when executed by processor 112, cause processor 112 to retrieve the size of the data to be transferred and/or the classification of the data from database 152 to determine the features associated with the task 160. In particular embodiments, the user may provide the priority associated with the task 160. In particular embodiments, the database 152 may provide the priority associated with the task 160.

Software instructions 116, when executed by processor 112, further cause processor 112 to collect features associated with a real-time computing environment for the task 160. The features associated with the real-time computing environment for the task 160 may comprise a network bandwidth between the client system 110 and the database server 150, a measured network latency between the client system 110 and the database server 150, hardware capacities of the database server 150, including memory and processors, and hardware capacities of the client system 110, including memory and processors.

Software instructions 116, when executed by processor 112, cause processor 112 to determine an optimal number of sessions for the task 160 by processing the features associated with the task 160 and the features associated with the real-time computing environment for the task with the AI model 130.

Software instructions 116, when executed by processor 112, cause processor 112 to determine whether the optimal number that is determined using the AI model 130 is different from the first number received in the first request. When the optimal number determined using the AI model 130 is different from the first number, software instructions 116, when executed by processor 112, further cause processor 112 to provide the determined optimal number of sessions for the task 160 as the recommended number of sessions for the task.

Software instructions 116, when executed by processor 112, cause processor 112 to receive a second request to establish a second number of sessions with the database server 150 for the task 160. Software instructions 116, when executed by processor 112, cause processor 112 to determine that the recommended number of sessions for the task 160 has already been provided. Software instructions 116, when executed by processor 112, cause processor 112 to establish the second number of sessions 170 with the database server 150 for the task 160 in response to the determination that the recommended number of sessions for the task has already been provided.

Software instructions 116, when executed by processor 112, further cause processor 112 to detect the completion of the task. Software instructions 116, when executed by processor 112, further cause processor 112 to measure a session utilization ratio associated with the task and an amount of time to complete the task. Software instructions 116, when executed by processor 112, further cause processor 112 to determine, based on the session utilization ratio and the amount of time, whether the second number is within a range of acceptable numbers of sessions for the task. Software instructions 116, when executed by processor 112, further cause processor 112 to re-train the AI model 130 when the second number is determined to be beyond the range of acceptable numbers of sessions for the task.

Operational Flow

In one embodiment, the client system 110 may receive a first request 182 from the user to perform a task 160 that comprises accessing a database 152 on the database server 150. The first request 182 may comprise information associated with the task 160. In particular embodiments, the information associated with the task 160 may comprise one or more required operations to complete the task 160, including establishing a first number of sessions with the database server 150, transferring data between the client system 110 and the database server 150, or any suitable actions to complete the task 160. The information associated with the task 160 may further comprise an identification of the data to be transferred, a classification of the data to be transferred, a priority associated with the task 160, or any suitable information associated with the task 160.

In one embodiment, the client system 110 may determine whether a recommended number of sessions for the task 160 has been provided. When the client system 110 determines that the recommended number of sessions for the task 160 has not been provided, the client system 110 may determine an optimal number of sessions for the task 160 using the AI model 130. First the client system 110 may collect input features 192 to be processed by the AI model 130 to compute the optimal number of sessions for completing the task 160. The input features 192 may comprise features associated with the task 160 and features associated with the real-time computing environment for the task 160. At least a part of the features associated with the task 160 may be retrieved from the request 182. The client system 110 may determine the rest of the features associated with the task 160 from one or more of the datasets 140A, 140B, and 140C or from one or more of the databases 152A, 152B, and 152C. The client system 110 may collect the features associated with the real-time computing environment for the task 160 by measuring network latency, accessing configuration information associated with the network resources, such as an end-to-end bandwidth between the client system 110 and the database server 150, and configuration information associated with computing resources, such as processors and memory of the client system 110 and the database server 150, or performing any suitable operations to collect the features associated with the real-time computing environment.

In one embodiment, the client system 110 may determine an optimal number of sessions for completing the task 160 by providing the input features 192 to the AI model 130. The AI model 130 may calculate the optimal number of sessions for completing the task 160 by processing the input features 192. The client system 110 may receive the calculated optimal number 194 of sessions for completing the task 160 from the AI model 130.

In one embodiment, the client system 110 may determine whether the optimal number 194 received from the AI model 130 is different from the first number in the first request 182. Upon determining that the optimal number 194 is different from the first number, the client system 110 may provide a recommendation 184 that includes the determined optimal number 194 of sessions for the task 160 as a recommended number of sessions for the task 160.

In one embodiment, the client system 110 may receive a second request 182 from the user to perform the task 160. The second request 182 may specify a second number of sessions to be established with the database server 150 to complete the task 160. The client system 110 determines that the recommended number of sessions for the task has already been provided in the recommendation 184. In response to the determination that the recommended number of sessions for the task has already been provided, the client system 110 may establish the second number of sessions 170 with the database server 150 for the task 160. The client system 110 may perform the remaining operations specified in the second request 182 to complete the task 160.

In one embodiment, the client system 110 may detect the completion of the task 160. The client system 110 may measure a session utilization ratio associated with the task 160 and an amount of time to complete the task 160. The client system 110 may determine whether the second number is identical to the recommended number of sessions for the task 160. When the second number is determined to be identical to the recommended number, the client system 110 may determine whether the second number is within a range of acceptable numbers of sessions for the task based on the session utilization ratio and the amount of time. The range of acceptable numbers may be centered at an optimal number of sessions for the task 160 determined based on the measured session utilization ratio associated with the task 160 and the amount of time to complete the task 160. When the client system 110 determines that the second number is beyond the range of acceptable numbers for the task 160, the client system 110 may initiate re-training of the AI model 130. Training data for re-training the AI model 130 may include input features associated with the task 160 and the optimal number of sessions for the tasks 160 determined based on the measured session utilization ratio associated with the task 160 and the amount of time to complete the task 160.

Figure 2:
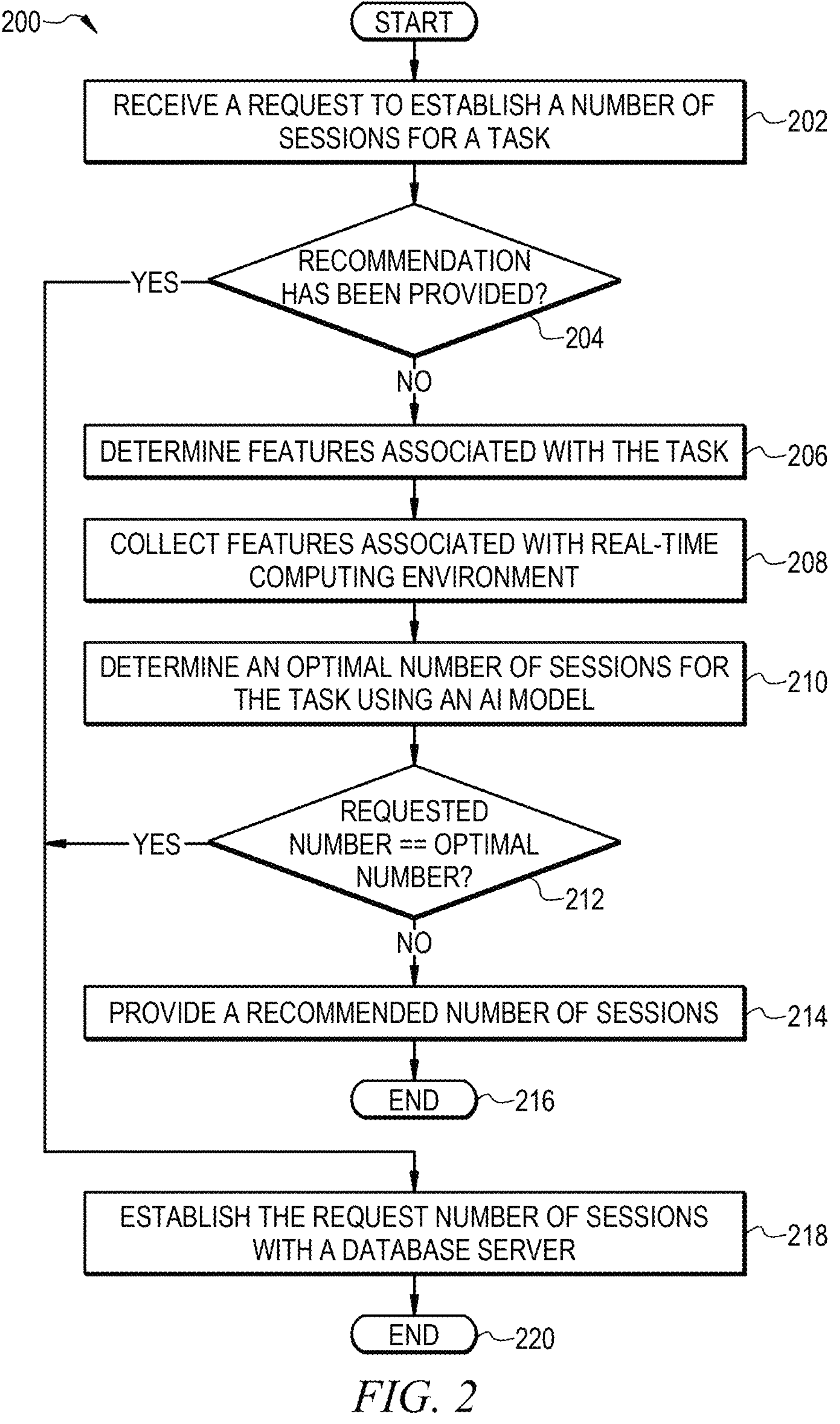
FIG. 2 illustrates an example flowchart of a method for recommending an optimal number of sessions to complete a task, in accordance with one or more embodiments of the present disclosure.

Example Methods for Recommending an Optimal Number of Sessions to Complete a Task FIG. 2 illustrates an example flowchart of a method 200 for recommending an optimal number of sessions to complete a task, in accordance with one or more embodiments of the present disclosure. Modifications, additions, or omissions may be made to method 200. Method 200 may include more, fewer, or other operations. For example, operations may be performed in parallel or in any suitable order. While at times discussed as a client system 110, or components of any of thereof performing operations, any suitable system or components of the system may perform one or more operations of the method 200. For example, one or more operations of method 200 may be implemented, at least in part, in the form of software instructions (e.g., software instructions 116 of FIG. 1), stored on non-transitory, tangible, computer-readable media (e.g., memory 114 of FIG. 1) that when run by one or more processors (e.g., processor 112 of FIG. 1) may cause the one or more processors to perform operations 202-220.

After start, at operation 202, a client system 110 may receive a request to establish a number of sessions with a database server 150 for a task 160 that comprises accessing a database 152 on the database server 150. In particular embodiments, the client system 110 may receive a request from a user to perform the task 160, comprising accessing the database 152 on the database server 150. The request may comprise information associated with the task 160. In particular embodiments, the information associated with the task 160 may comprise one or more required operations to complete the task 160, including establishing a number of sessions with the database server 150, transferring data between the client system 110 and the database server 150, or any suitable actions to complete the task 160. The information associated with the task 160 may further comprise an identification of the data to be transferred, a classification of the data to be transferred, a priority associated with the task 160, or any suitable information associated with the task 160. In particular embodiments, the client system 110 may receive the request from a user device 120 associated with the user.

At operation 204, the client system 110 may determine whether a recommended number of sessions for the task 160 has been provided. If the client system 110 determines that the recommended number of sessions for the task 160 has been provided, method 200 proceeds to operation 218, where the client system 110 may establish the requested number of sessions with the database server 150 for the task 160. After operation 218, method 200 ends at operation 220.

If the client system 110 determines that the recommended number of sessions for the task 160 has not been provided, method 200 proceeds to operation 206, where the client system 110 may determine features associated with the task 160. The features associated with the task 160 may comprise a size of data to be transferred, a classification of the data, a priority associated with the task, or any suitable feature associated with the task 160. In some embodiments, a subset of the features associated with the task 160 may be provided by the user as a part of the request received at operation 202.

In one embodiment, the task 160 comprises uploading data into the database 152. In such a case, the client system 110 may measure the data to be uploaded to the database 152 in a storage associated with the client system 110 to determine the size of the data and/or the classification of the data. The storage associated with the client system 110 may comprise datasets 140A, 140B, 140C.

In one embodiment, the task 160 comprises downloading data from the database 152. In such a case, the client system 110 may retrieve the size of the data to be transferred and/or the classification of the data from the database. The client system 110 may retrieve any further suitable features associated with the task 160 from the database 152.

At operation 208, the client system 110 may collect features associated with a real-time computing environment for the task 160. The features associated with the real-time computing environment for the task 160 may comprise a network bandwidth between the client system 110 and the database server 150, a measured network latency between the client system 110 and the database server 150, hardware capacities of the database server 150, hardware capacities of the client system 110, or any suitable feature associated with the real-time computing environment for the task 160. Hardware capacities may comprise a number of processors, a speed of processors, a size of memory, a bandwidth of memory, or any suitable hardware capacities.

At operation 210, the client system 110 may determine an optimal number of sessions for the task 160 by processing the features associated with the task 160 and the features associated with the real-time computing environment for the task 160 with an AI model 130. The AI model 130 is configured to compute a desired number of sessions to establish with a database server 150 for a given task 160 based on features associated with the given task 160 and features associated with a real-time computing environment for the given task 160. The AI model 130 is trained using data extracted from historical records associated with previous tasks. In some embodiments, the AI model 130 is deployed on the client system 110. In some embodiments, the AI model 130 is deployed on a computing system different from the client system 110.

At operation 212, the client system 110 may determine whether the optimal number determined using the AI model 130 is identical to the requested number received at operation 202. If the client system 110 determines that the optimal number is identical to the requested number, method 200 proceeds to operation 218, where the client system 110 may establish the requested number of sessions with the database server 150 for the task 160. After operation 218, method 200 ends at operation 220.

If the client system 110 determines that the optimal number is different from the requested number, method 200 proceeds to operation 214, where the client system 110 may provide the determined optimal number of sessions for the task 160 as a recommended number of sessions for the task 160. Method 200 then ends at operation 216.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "operation for" are explicitly used in the particular claim.

Example Methods for Preparing the AI Model

Figure 3:
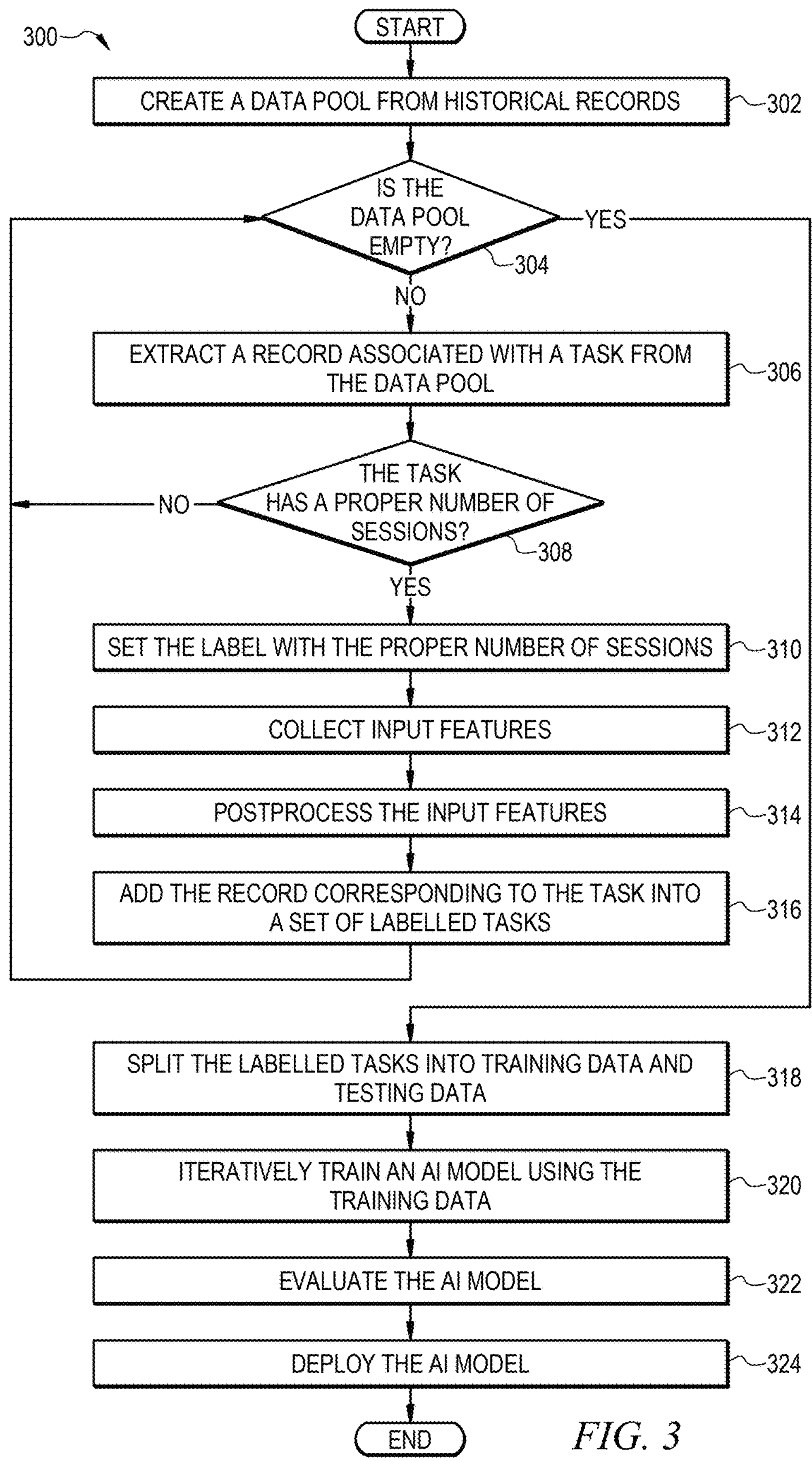
FIG. 3 illustrates an example flowchart of a method for preparing an AI model that calculates an optimal number of sessions to complete a task, in accordance with one or more embodiments of the present disclosure.

FIG. 3 illustrates an example flowchart of a method for preparing an AI model that calculates an optimal number of sessions to complete a task, in accordance with one or more embodiments of the present disclosure. Modifications, additions, or omissions may be made to method 300. Method 300 may include more, fewer, or other operations. For example, operations may be performed in parallel or in any suitable order. While at times discussed as a client system 110, or components of any of thereof performing operations, any suitable system or components of the system may perform one or more operations of the method 300. For example, one or more operations of method 300 may be implemented, at least in part, in the form of software instructions (e.g., software instructions 116 of FIG. 1), stored on non-transitory, tangible, computer-readable media (e.g., memory 114 of FIG. 1) that when run by one or more processors (e.g., processor 112 of FIG. 1) may cause the one or more processors to perform operations 302-326.

After start, at operation 302, a client system 110 may create a data pool from historical records associated with previous tasks 160. The data pool may comprise records associated with the previously performed tasks 160. Each record may include information associated with a previously performed task 160, such as the size of data transferred as a part of the task 160, the classification of the data transferred as the part of the task 160, the priority associated with the task 160, the network bandwidth between the client system 110 and the database server 150 at the time the task 160 was performed, the measured network latency between the client system 110 and the database server 150 at the time the task 160 was performed, hardware capacities of the database server 150 and the client system 110 when the task 160 was performed, or any other suitable information associated with the previously performed task 160.

At operation 304, the client system 110 may determine whether the data pool is empty, which means that all the previously performed tasks in the data pool have been filtered out or processed to be labelled tasks for training the AI model 130. If the client system 110 determines that the data pool is empty, method 300 proceeds to operation 318, where the client system 110 may split the labelled tasks into training data and testing data.

If the client system 110 determines that the data pool is not empty yet, method 300 proceeds to operation 306, where the client system 110 may extract a record associated with a previously performed task 160 from the data pool.

At operation 308, the client system 110 may determine whether the previously performed task in the extracted record has a proper number of sessions. The client system 110 may determine whether the previously performed task 160 has the proper number of established sessions based on a session utilization ratio and an amount of time to complete the previously performed task 160 in the extracted record. When the session utilization ratio in the extracted record is higher than a threshold, the client system 110 may consider that the number of established sessions for the previously performed task 160 is not too large. Also, the client system 110 may compare the amount of time to complete the previously performed task 160 in the historical record with the average amount of time to complete tasks of a similar type. When the amount of time corresponding to the previously performed task 160 in the extracted record is within a pre-defined range of the average amount of time to complete the tasks of a similar type, the client system 110 may consider that the number of established sessions is not too small. The client system 110 may determine that the number of established sessions for the previously performed task 160 in the extracted record is a proper number if the number of established sessions is considered to be neither too large nor too small.

At operation 310, in response to the determination that the number of established sessions is the proper number, the client system 110 may set the number of established sessions for the previously performed task 160 as the label, a ground truth value for the training, for the previously performed task 160.

At operation 312, the client system 110 may collect input features for the previously performed task 160 from the extracted record. The input features may include features associated with the previously performed task 160 and features associated with the computing environment at the time the previously performed task 160 was performed.

At operation 314, the client system 110 may postprocess the collected input features. Postprocessing may include filling in any missing values based on the historical records of the other tasks. Postprocessing may also include filtering out outliers.

At operation 316, the client system 110 may add the record corresponding to the previously performed task 160, which is labelled at operation 310, into a set of labelled tasks. At the end of operation 316, method 300 proceeds to operation 304 to continue the loop until all the records in the data pool are handled. After the loop concludes, that is, when the client system 110 identifies the data pool as empty at operation 304, method 300 advances to operation 318, where the client system 110 may split the labelled tasks into training data and testing data.

At operation 320, the client system 110 may iteratively train the AI model 130 using the training data until a training completion condition is satisfied. At a pre-determined interval, the client system 110 may test the trained AI model 130 using the testing data, which is different from the training data as a result of splitting at operation 318. In one embodiment, the training completion condition is satisfied when the number of training iterations reaches a pre-determined number of iterations. In another embodiment, the training completion condition is satisfied when the training loss starts to increase. In yet another embodiment, the training completion condition is satisfied when the testing loss starts to increase while the training loss keeps decreasing.

In one embodiment, the AI model 130 may be a multi-linear regression model. The multi-linear regression model may be used to model the relationship between dependent variables, labels, and one or more independent variables, features, by fitting a linear equation to observed data. In such a scenario, training the AI model 130 may be a process of determining a coefficient for each input feature representing an impact of the input feature on the number of sessions required for the task.

At operation 322, the client system 110 may evaluate the trained AI model 130. Evaluating the AI model 130 may be based on a proportion of variance in a dependent variable that is explained by independent variables. The proportion of variance is also known as the coefficient of determination. The value ranges from 0 to 1. Zero means that the model explains none of the variability. One means that the model explains all of the variability. The AI model 130 may also be evaluated based on p-values of individual coefficients. The p-value of an individual coefficient tests the null hypothesis that the coefficient is equal to zero, meaning that the corresponding feature has no effect on the label value.

At operation 324, the client system 110 may deploy the AI model 130 once the evaluation is successful at operation 322. In some embodiments, the AI model 130 may be deployed on the client system 110. In such a case, the memory 114 may include the AI model 130 in addition to the instructions 116. In some embodiments, the AI model 130 may be deployed on a computing system different from the client system 110. In such a case, the client system 110 may access the AI model 130 using an API provided by the AI model 130. Method 300 then ends at operation 326.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "operation for" are explicitly used in the particular claim.

Figure 4:
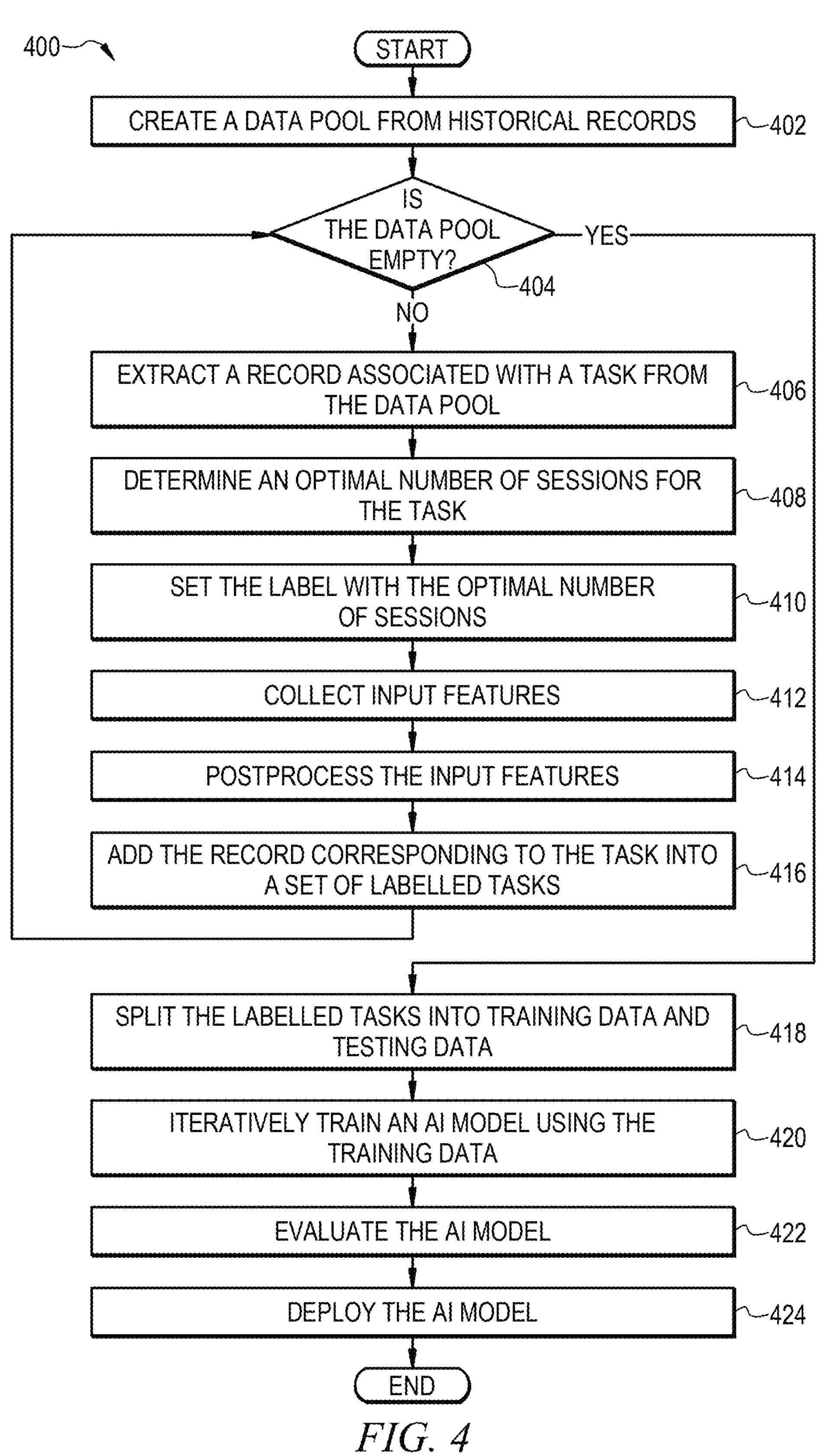
FIG. 4 illustrates an example flowchart of another method for preparing an AI model that calculates an optimal number of sessions to complete a task, in accordance with one or more embodiments of the present disclosure.

FIG. 4 illustrates an example flowchart of another method for preparing an AI model that calculates an optimal number of sessions to complete a task, in accordance with one or more embodiments of the present disclosure. Unlike method 300, where only previously performed tasks having the proper numbers of established sessions are labelled to be used for training the AI model 130, all the previously performed tasks with valid feature information may be labelled with determined optimal number of sessions in method 400. Modifications, additions, or omissions may be made to method 400. Method 400 may include more, fewer, or other operations. For example, operations may be performed in parallel or in any suitable order. While at times discussed as a client system 110, or components of any of thereof performing operations, any suitable system or components of the system may perform one or more operations of the method 400. For example, one or more operations of method 400 may be implemented, at least in part, in the form of software instructions (e.g., software instructions 116 of FIG. 1), stored on non-transitory, tangible, computer-readable media (e.g., memory 114 of FIG. 1) that when run by one or more processors (e.g., processor 112 of FIG. 1) may cause the one or more processors to perform operations 402-426.

After start, at operation 402, a client system 110 may create a data pool from historical records associated with previous tasks 160. The data pool may comprise records associated with the previously performed tasks 160. Each record may include information associated with a previously performed task 160, such as the size of data transferred as a part of the task 160, the classification of the data transferred as the part of the task 160, the priority associated with the task 160, the network bandwidth between the client system 110 and the database server 150 at the time the task 160 was performed, the measured network latency between the client system 110 and the database server 150 at the time the task 160 was performed, hardware capacities of the database server 150 and the client system 110 when the task 160 was performed, or any other suitable information associated with the previously performed task 160.

At operation 404, the client system 110 may determine whether the data pool is empty, which means that all the previously performed tasks in the data pool have been processed to be labelled tasks for training the AI model 130. If the client system 110 determines that the data pool is empty, method 400 proceeds to operation 418, where the client system 110 may split the labelled tasks into training data and testing data.

If the client system 110 determines that the data pool is not empty yet, method 400 proceeds to operation 406, where the client system 110 may extract a record associated with a previously performed task 160 from the data pool.

At operation 408, the client system 110 may determine an optimal number of sessions for the previously performed task 160 corresponding to the extracted record based on the number of actually established sessions for the previously performed task 160, a session utilization ratio, and an amount of time to complete the task 160 in the extracted record. When the session utilization ratio is lower than a first pre-determined threshold, meaning that the sessions were under-utilized, a number lower than the number of actually established sessions in the extracted record may be determined as the optimal number of sessions for the task. When the session utilization ratio is higher than a second predetermined threshold and the amount of time to complete the task is greater than a threshold time for a type corresponding to the task 160, a number higher than the number of actually established sessions in the extracted record is determined as the optimal number of sessions for the task. The threshold time for the type corresponding to the task 160 may be determined based on the average amount of time to complete tasks of a similar type.

At operation 410, the client system 110 may set the determined optimal number of sessions as the label, a ground truth value for the training, for the previously performed task 160.

At operation 412, the client system 110 may collect input features for the previously performed task 160 from the extracted record. The input features may include features associated with the previously performed task 160 and features associated with the computing environment at the time the previously performed task 160 was performed.

At operation 414, the client system 110 may postprocess the collected input features. Postprocessing may include filling in any missing values based on the historical records of the other tasks. Postprocessing may also include filtering out outliers.

At operation 416, the client system 110 may add the record corresponding to the previously performed task 160, which is labelled at operation 410, into a set of labelled tasks. At the end of operation 416, method 400 proceeds to operation 404 to continue the loop until all the records in the data pool are handled. After the loop concludes, that is, when the client system 110 identifies the data pool as empty at operation 404, method 400 advances to operation 418, where the client system 110 may split the labelled tasks into training data and testing data.

At operation 420, the client system 110 may iteratively train the AI model 130 using the training data until a training completion condition is satisfied.

At operation 422, the client system 110 may evaluate the trained AI model 130. Evaluating the AI model 130 may be based on a proportion of variance in a dependent variable that is explained by independent variables. The AI model 130 may also be evaluated based on p-values of individual coefficients.

At operation 424, the client system 110 may deploy the AI model 130 once the evaluation is successful at operation 422. In some embodiments, the AI model 130 may be deployed on the client system 110. In such a case, the memory 114 may include the AI model 130 in addition to the instructions 116. In some embodiments, the AI model 130 may be deployed on a computing system different from the client system 110. In such a case, the client system 110 may access the AI model 130 using an API provided by the AI model 130. Method 400 then ends at operation 426.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "operation for" are explicitly used in the particular claim.

The invention claimed is:

1. A system, comprising:

a memory operable to store:

an artificial intelligence (AI) model that is configured to compute a desired number of sessions to establish with a database server for a given task based on features associated with the given task and features associated with real-time computing environment for the given task, wherein the AI model is trained using data extracted from historical records associated with previous tasks; and a processor, operably coupled to the memory, and configured to:

receive a first request to establish a first number of sessions with the database server for a task that comprises accessing a database on the database server, wherein the request comprises information associated with the task;

determine whether a recommended number of sessions for the task has been provided;

responsive to the determination that the recommended number of sessions for the task has not been provided:

determine features associated with the task, wherein the features associated with the task comprise a size of data to be transferred, a classification of the data, and a priority associated with the task;

collect features associated with a real-time computing environment for the task, wherein the features associated with the real-time computing environment for the task comprise a network bandwidth between the system and the database server, a measured network latency between the system and the database server, hardware capacities of the database server, and hardware capacities of the system;

determine an optimal number of sessions for the task by processing the features associated with the task and the features associated with the real-time computing environment for the task with the AI model;

determine that the optimal number is different from the first number; and provide, responsive to the determination that the optimal number is different from the first number, the determined optimal number of sessions for the task as the recommended number of sessions for the task;

receive a second request to establish a second number of sessions with the database server for the task;

determine that the recommended number of sessions for the task has already been provided; and establish, responsive to the determination that the recommended number of sessions for the task has already been provided, the second number of sessions with the database server for the task.

2. The system of claim 1, wherein the AI model is a regression model, and wherein the processor is further configured to:

determine a label for each task in the historical records with a corresponding optimal number of sessions;

collect, for each labelled task, input features from the historical records, wherein the input features comprise features associated with the task and features associated with a computing environment for the task;

postprocess the collected input features, wherein postprocessing comprises filling any missing values based on the historical records;

divide the labels and the input features for the labelled task into training data and testing data;

iteratively train the AI model using the training data until a training completion condition is satisfied;

evaluate the AI model based on a proportion of variance in a dependent variable, representing the labels, that is explained by independent variables, corresponding to the input features, and p-values of individual coefficients; and deploy the AI model in conjunction with a successful evaluation.

3. The system of claim 2, wherein, to determine the label of each task, the processor is further configured to:

select, among tasks in the historical records, a subset of tasks, each having a proper number of established sessions, wherein whether the task has the proper number of established sessions is determined based on a session utilization ratio and an amount of time to complete the task in the historical records; and determine the number of established sessions as the label for the task.

4. The system of claim 2, wherein, to determine the label of each task, the processor is further configured to:

determine, for each task in the historical records, an optimal number of sessions for the task based on a number of established sessions for the task, a session utilization ratio, and an amount of time to complete the task in the historical records, wherein, to determine the optimal number of sessions for the task, the processor is further configured to:

determine, when the session utilization ratio is lower than a first pre-determined threshold, a lower number than the number of established sessions in the historical records as the optimal number of sessions for the task; and determine, when the session utilization ratio is higher than a second pre-determined threshold and the amount of time to complete the task is greater than a threshold time for a type corresponding to the task, a higher number than the number of established sessions in the historical records as the optimal number of sessions for the task.

5. The system of claim 1, wherein the task comprises uploading data into the database, and wherein, to determine the features associated with the task, the processor is further configured to:

measure the data to be uploaded to the database in a storage associated with the system.

6. The system of claim 1, wherein the task comprises downloading data from the database, and wherein, to determine the features associated with the task, the processor is further configured to:

retrieve the size of the data to be transferred and/or the classification of the data from the database.

7. The system of claim 1, wherein the processor is further configured to:

measure, upon completion of the task, a session utilization ratio associated with the task and an amount of time to complete the task;

determine, based on the session utilization ratio and the amount of time, whether the second number is within a range of acceptable numbers of sessions for the task; and re-train, in response to the determination that the second number is beyond the range of acceptable numbers of sessions for the task, the AI model.

8. A method comprising, by a system:

receiving a first request to establish a first number of sessions with a database server for a task that comprises accessing a database on the database server, wherein the request comprises information associated with the task;

determining whether a recommended number of sessions for the task has been provided;

responsive to the determination that the recommended number of sessions for the task has not been provided:

determining features associated with the task, wherein the features associated with the task comprise a size of data to be transferred, a classification of the data, and a priority associated with the task;

collecting features associated with a real-time computing environment for the task, wherein the features associated with the real-time computing environment for the task comprise a network bandwidth between the system and the database server, a measured network latency between the system and the database server, hardware capacities of the database server, and hardware capacities of the system;

determining an optimal number of sessions for the task by processing the features associated with the task and the features associated with the real-time computing environment for the task with an artificial intelligence (AI) model that is configured to compute a desired number of sessions to establish with the database server for a given task based on features associated with the given task and features associated with real-time computing environment for the given task, wherein the AI model is trained using data extracted from historical records associated with previous tasks;

determining that the optimal number is different from the first number; and providing, responsive to the determination that the optimal number is different from the first number, the determined optimal number of sessions for the task as the recommended number of sessions for the task;

receiving a second request to establish a second number of sessions with the database server for the task;

determining that the recommended number of sessions for the task has already been provided; and establishing, responsive to the determination that the recommended number of sessions for the task has already been provided, the second number of sessions with the database server for the task.

9. The method of claim 8, wherein the AI model is a regression model, further comprising:

determining a label for each task in the historical records with a corresponding optimal number of sessions;

collecting, for each labelled task, input features from the historical records, wherein the input features comprise features associated with the task and features associated with a computing environment for the task;

postprocessing the collected input features, wherein post-processing comprises filling any missing values based on the historical records;

dividing the labels and the input features for the labelled task into training data and testing data;

iteratively training the AI model using the training data until a training completion condition is satisfied;

evaluating the AI model based on a proportion of variance in a dependent variable, representing the labels, that is explained by independent variables, corresponding to the input features, and p-values of individual coefficients; and deploying the AI model in conjunction with a successful evaluation.

10. The method of claim 9, wherein determining the label of each task comprises:

selecting, among tasks in the historical records, a subset of tasks, each having a proper number of established sessions, wherein whether the task has the proper number of established sessions is determined based on a session utilization ratio and an amount of time to complete the task in the historical records; and determining the number of established sessions as the label for the task.

11. The method of claim 9, wherein determining the label of each task comprises:

determining, for each task in the historical records, an optimal number of sessions for the task based on a number of established sessions for the task, a session utilization ratio, and an amount of time to complete the task in the historical records by:

determining, when the session utilization ratio is lower than a first pre-determined threshold, a lower number than the number of established sessions in the historical records as the optimal number of sessions for the task; and determining, when the session utilization ratio is higher than a second pre-determined threshold and the amount of time to complete the task is greater than a threshold time for a type corresponding to the task, a higher number than the number of established sessions in the historical records as the optimal number of sessions for the task.

12. The method of claim 8, wherein the task comprises uploading data into the database, and wherein determining the features associated with the task comprises:

measuring the data to be uploaded to the database in a storage associated with the system.

13. The method of claim 8, wherein the task comprises downloading data from the database, and wherein determining the features associated with the task comprises:

retrieving the size of the data to be transferred and/or the classification of the data from the database.

14. The method of claim 8, further comprising:

measuring, upon completion of the task, a session utilization ratio associated with the task and an amount of time to complete the task;

determining, based on the session utilization ratio and the amount of time, whether the second number is within a range of acceptable numbers of sessions for the task; and re-training, in response to the determination that the second number is beyond the range of acceptable numbers of sessions for the task, the AI model.

15. A non-transitory computer-readable medium storing:

an artificial intelligence (AI) model that is configured to compute a desired number of sessions to establish with a database server for a given task based on features associated with the given task and features associated with real-time computing environment for the given task, wherein the AI model is trained using data extracted from historical records associated with previous tasks; and instructions that, when executed by a processor of a system, cause the processor to:

receive a first request to establish a first number of sessions with the database server for a task that comprises accessing a database on the database server, wherein the request comprises information associated with the task;

determine whether a recommended number of sessions for the task has been provided;

responsive to the determination that the recommended number of sessions for the task has not been provided:

determine features associated with the task, wherein the features associated with the task comprise a size of data to be transferred, a classification of the data, and a priority associated with the task;

collect features associated with a real-time computing environment for the task, wherein the features associated with the real-time computing environment for the task comprise a network bandwidth between the system and the database server, a measured network latency between the system and the database server, hardware capacities of the database server, and hardware capacities of the system;

determine an optimal number of sessions for the task by processing the features associated with the task and the features associated with the real-time computing environment for the task with the AI model;

determine that the optimal number is different from the first number; and provide, responsive to the determination that the optimal number is different from the first number, the determined optimal number of sessions for the task as the recommended number of sessions for the task;

receive a second request to establish a second number of sessions with the database server for the task;

determine that the recommended number of sessions for the task has already been provided; and establish, responsive to the determination that the recommended number of sessions for the task has already been provided, the second number of sessions with the database server for the task.

16. The non-transitory computer-readable medium of claim 15, wherein the AI model is a regression model, and wherein the instructions further cause the processor to:

determine a label for each task in the historical records with a corresponding optimal number of sessions;

collect, for each labelled task, input features from the historical records, wherein the input features comprise features associated with the task and features associated with a computing environment for the task;

postprocess the collected input features, wherein postprocessing comprises filling any missing values based on the historical records;

divide the labels and the input features for the labelled task into training data and testing data;

iteratively train the AI model using the training data until a training completion condition is satisfied;

evaluate the AI model based on a proportion of variance in a dependent variable, representing the labels, that is explained by independent variables, corresponding to the input features, and p-values of individual coefficients; and deploy the AI model in conjunction with a successful evaluation.

17. The non-transitory computer-readable medium of claim 16, wherein, to determine the label of each task, the instructions further cause the processor to:

select, among tasks in the historical records, a subset of tasks, each having a proper number of established sessions, wherein whether the task has the proper number of established sessions is determined based on a session utilization ratio and an amount of time to complete the task in the historical records; and determine the number of established sessions as the label for the task.

18. The non-transitory computer-readable medium of claim 16, wherein, to determine the label of each task, the instructions further cause the processor to:

determine, for each task in the historical records, an optimal number of sessions for the task based on a number of established sessions for the task, a session utilization ratio, and an amount of time to complete the task in the historical records, wherein, to determine the optimal number of sessions for the task, the instructions further cause the processor to:

determine, when the session utilization ratio is lower than a first pre-determined threshold, a lower number than the number of established sessions in the historical records as the optimal number of sessions for the task; and determine, when the session utilization ratio is higher than a second pre-determined threshold and the amount of time to complete the task is greater than a threshold time for a type corresponding to the task, a higher number than the number of established sessions in the historical records as the optimal number of sessions for the task.

19. The non-transitory computer-readable medium of claim 15, wherein the task comprises uploading data into the database, and wherein, to determine the features associated with the task, the instructions further cause the processor to:

measure the data to be uploaded to the database in a storage associated with the system.

20. The non-transitory computer-readable medium of claim 15, wherein the task comprises downloading data from the database, and wherein, to determine the features associated with the task, the instructions further cause the processor to:

retrieve the size of the data to be transferred and/or the classification of the data from the database.

* * * * *